United States Patent
Hara et al.

(10) Patent No.: US 11,414,539 B2
(45) Date of Patent: Aug. 16, 2022

(54) FLUORINATED COPOLYMER DISPERSION, METHOD FOR ITS PRODUCTION AND ARTICLE

(71) Applicant: AGC Inc., Chiyoda-ku (JP)

(72) Inventors: Hiroyuki Hara, Chiyoda-ku (JP); Mika Sugimoto, Chiyoda-ku (JP); Motohiro Takemura, Chiyoda-ku (JP); Hideki Tomizawa, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 85 days.

(21) Appl. No.: 15/931,697

(22) Filed: May 14, 2020

(65) Prior Publication Data
US 2020/0270439 A1    Aug. 27, 2020

Related U.S. Application Data

(63) Continuation of application No. PCT/JP2018/041730, filed on Nov. 9, 2018.

(30) Foreign Application Priority Data

Jan. 15, 2018   (JP) .............................. JP2018-004492

(51) Int. Cl.
    *C08L 23/28*    (2006.01)

(52) U.S. Cl.
    CPC ......... *C08L 23/283* (2013.01); *C08L 2201/54* (2013.01); *C08L 2205/035* (2013.01)

(58) Field of Classification Search
    CPC .......................... C08L 23/283; C08L 2201/54
    See application file for complete search history.

(56) References Cited

U.S. PATENT DOCUMENTS

| | | |
|---|---|---|
| 5,565,607 A | 10/1996 | Maekawa et al. |
| 5,646,222 A | 7/1997 | Maekawa et al. |
| 2017/0275813 A1 | 9/2017 | Isobe et al. |

FOREIGN PATENT DOCUMENTS

| | | |
|---|---|---|
| JP | 01-026601 B2 | 5/1989 |
| JP | 02-159219 A | 6/1990 |
| JP | 06-287548 A | 10/1994 |
| JP | 06-293705 A | 10/1994 |
| JP | 06-345823 A | 12/1994 |
| JP | 07-133325 A | 5/1995 |
| JP | 09-143877 A | 6/1997 |
| JP | 3517977 B2 | 4/2004 |
| WO | WO 2016/098823 A1 | 6/2016 |

OTHER PUBLICATIONS

Machine translation of JPH07133325 (Year: 1995).*
International Search Report dated Feb. 12, 2019 in PCT/JP2018/041730 filed on Nov. 11, 2018.

* cited by examiner

*Primary Examiner* — Wenwen Cai
(74) *Attorney, Agent, or Firm* — Oblon, McClelland, Maier & Neustadt, L.L.P.

(57) ABSTRACT

To provide a fluorinated copolymer dispersion, whereby it is possible to obtain an article being excellent in water-and-oil repellency and less susceptible to a decrease in the water-and-oil repellency by alkali, etc. and which presents little impact to the environment by an organic solvent; a method for its production; and an article which is excellent in water-and-oil repellency and is less susceptible to a decrease in the water-and-oil repellency by alkali, etc. The fluorinated copolymer dispersion comprises an aqueous medium and a fluorinated copolymer dispersed in the aqueous medium, wherein the fluorinated copolymer has units based on the following monomer (a) and units based on the following monomer (b), the proportion of the units based on the monomer (a) being from 20 to 60 mol % to all units constituting the fluorinated copolymer, and the fluorinated copolymer has a number average molecular weight of from 10,000 to 100,000: Monomer (a): a compound represented by $CH_2=CH-R^f$ ($R^f$ is a $C_{1-8}$ perfluoroalkyl group); and Monomer (b): a monomer copolymerizable with the monomer (a).

14 Claims, No Drawings

FLUORINATED COPOLYMER DISPERSION, METHOD FOR ITS PRODUCTION AND ARTICLE

TECHNICAL FIELD

The present invention relates to a fluorinated copolymer dispersion, a method for its production, and an article treated with the fluorinated copolymer dispersion.

BACKGROUND ART

As a method for imparting water-and-oil repellency to the surface of an article (a fiber product, etc.), a method of treating the article with a water-and-oil repellent composition having dispersed in an aqueous medium a fluorinated copolymer having units based on a (meth)acrylate having a perfluoroalkyl group, is known. Further, in recent years, a fluorinated polymer having units based on a (meth)acrylate having a $C_6$ perfluoroalkyl group is used as an environmentally friendly model. However, ester bonds in units based on a (meth)acrylate are susceptible to cleavage by hydrolysis by alkali, etc. Therefore, it is possible that perfluoroalkyl groups are lost from the fluorinated copolymer, thus leading to a decrease in the water-and-oil repellency of the article.

As a fluorinated copolymer which is environmentally friendly and less susceptible to a decrease in the water-and-oil repellency due to hydrolysis by alkali, etc., a fluorinated copolymer having no units based on a (meth)acrylate having a perfluoroalkyl group, is known. As a water-and-oil repellent composition containing a fluorinated copolymer having no units based on a (meth)acrylate having a perfluoroalkyl group, a water-and-oil repellent composition containing a fluorinated copolymer having units based on a (perfluoroalkyl)ethylene, has been proposed (Patent Documents 1 and 2).

PRIOR ART DOCUMENTS

Patent Documents

Patent Document 1: JP-A-H1-26601
Patent Document 2: Japanese Patent No. 3517977

DISCLOSURE OF INVENTION

Technical Problem

The water-and-oil repellent composition described in Patent Document 1 is made to be in such a solution state that the fluorinated copolymer is dissolved in an organic solvent (on page 9, left column in Patent Document 1). Therefore, it is concerned that the organic solvent is volatilized at the time of treating an article, and its impact to the environment is concerned.

Further, the fluorinated copolymer described in Patent Document 1 is made to have a relatively low molecular weight for the solubility in an organic solvent (on page 2, left column in Patent Document 1). To begin with, the fluorinated copolymer as described in Patent Documents 1 and 2 is produced by bulk polymerization, whereby it is difficult to make it to have a high molecular weight (Examples of Patent Documents 1 and 2). An article treated with the water-and-oil repellent composition containing the fluorinated copolymer having a relatively low molecular weight, is insufficient in the water-and-oil repellency.

The present invention is to provide a fluorinated copolymer dispersion whereby it is possible to obtain an article being excellent in water-and-oil repellency and less susceptible to a decrease in the water-and-oil repellency by alkali, etc., and which presents little impact to the environment by an organic solvent; a method of its production; and an article being excellent in water-and-oil repellency and less susceptible to a decrease in the water-and-oil repellency by alkali, etc.

Solution to Problem

The present invention has the following embodiments.
<1> A fluorinated copolymer dispersion, which comprises an aqueous medium and a fluorinated copolymer dispersed in the aqueous medium, and which is characterized in that
the fluorinated copolymer has units based on the following monomer (a) and units based on the following monomer (b),
the proportion of units based on the monomer (a) is from 20 to 60 mol % to all units constituting the fluorinated copolymer, and
the number average molecular weight of the fluorinated copolymer is from 10,000 to 100,000:
monomer (a): a compound represented by the following formula (1):

$$CH_2=CH-R^f \qquad (1),$$

wherein $R^f$ is a $C_{1-8}$ perfluoroalkyl group,
monomer (b): a monomer copolymerizable with the monomer (a).
<2> The dispersion according to <1>, wherein $R^f$ is a $C_{1-6}$ perfluoroalkyl group.
<3> The dispersion according to <1> or <2>, wherein at least a part of the monomer (b) is a compound represented by $CH_2=CH-Q$ or $CH_2=CHCH_2-Q$, wherein Q is a halogen atom or an organic group in which the binding terminal atom is an oxygen atom, a nitrogen atom or a sulfur atom.
<4> The dispersion according to <3>, wherein at least a part of the monomer (b) is a compound represented by $CH_2=CH-Q$, and the compound represented by $CH_2=CH-Q$ is a carboxylic acid vinyl ester, an alkyl vinyl ether, a hydroxyalkyl vinyl ether or a vinyl halide.
<5> The dispersion according to <3> or <4>, wherein the proportion of the total of units based on the monomer (a), units based on the $CH_2=CH-Q$ and units based on the $CH_2=CHCH_2-Q$ is from 80 to 100 mol % to all units constituting the fluorinated copolymer.
<6> The dispersion according to any one of <1> to <5>, wherein the fluorinated copolymer contains units based on a vinyl halide, as a part of units based on the monomer (b), and the proportion of units based on the vinyl halide is from 1 to 50 mol % to the total amount of units based on the monomer (b).
<7> The dispersion according to any one of <1> to <6>, wherein the proportion of the fluorinated copolymer having a number molecular weight of at most 3,000 is at most 2% to the entire fluorinated copolymer.
<8> The dispersion according to any one of <1> to <7>, which further contains a non-fluorinated surfactant.
<9> A method for producing a fluorinated copolymer dispersion, which is a method of obtaining a fluorinated copolymer dispersion by polymerizing, in an emulsion comprising an aqueous medium, monomer components, a non-fluorinated surfactant and a polymerization initiator, said monomer components, and which is characterized in that said monomer components comprise the following monomer (a) and the following monomer (b), the proportion of the monomer (a) is from 20 to 60 mol % to the total of said monomer components, and the number average molecular weight of the fluorinated copolymer is from 10,000 to 100,000:

monomer (a): a compound represented by the following formula (1):

$$CH_2\!\!=\!\!CH\!\!-\!\!R^f \quad (1),$$

wherein $R^f$ is a $C_{1-8}$ perfluoroalkyl group, monomer (b): a monomer copolymerizable with the monomer (a).

<10> The production method according to <9>, wherein $R^f$ is a $C_{1-6}$ perfluoroalkyl group.

<11> The production method according to <9> or <10>, wherein the concentration of the monomer components in the emulsion is from 40 to 70 mass %.

<12> The production method according to any one of <9> to <11>, wherein the conversion of the monomer components to the fluorinated copolymer is at least 80%.

<13> The production method according to any one of <9> to <12>, wherein the proportion of the fluorinated copolymer having a number molecular weight of at most 3,000 is at most 2% to the entire fluorinated copolymer.

<14> An article treated with the fluorinated copolymer dispersion as defined in any one of <1> to <8>.

Advantageous Effects of Invention

The fluorinated copolymer dispersion of the present invention is capable of obtaining an article being excellent in water-and-oil repellency and less susceptible to a decrease in the water-and-oil repellency by alkali, etc., and presents little impact to the environment by an organic solvent.

According to the method for producing a fluorinated copolymer dispersion of the present invention, it is possible to produce a fluorinated copolymer dispersion which is capable of obtaining an article being excellent in water-and-oil repellency and less susceptible to a decrease in the water-and-oil repellency by alkali, etc., and which presents little impact to the environment by an organic solvent.

The article of the present invention is excellent in water-and-oil repellency and less susceptible to a decrease in the water-and-oil repellency by alkali, etc.

DESCRIPTION OF EMBODIMENTS

The following definitions of terms apply throughout the specification and claims.

A "unit based on a monomer" is a general term for an atomic group directly formed by polymerization of one molecule of the monomer, and an atomic group obtainable by chemical conversion of a part of the atomic group.

A "(meth)acrylate" is a general term for an acrylate and a methacrylate. Similarly, a "(meth)acryloyloxy group" is a general term for an acryloyloxy group and a methacryloyloxy group.

The number-average molecular weight and weight-average molecular weight of a fluorinated copolymer are polymethyl methacrylate equivalent molecular weights obtainable by measurement by gel permeation chromatography (hereinafter referred to as "GPC measurement") using a calibration curve prepared by using standard polymethyl methacrylate samples.

The solid content concentration is calculated by solid content mass/sample mass×100, where the sample mass is the mass of the sample before heating, and the solid content mass is the mass after drying the sample in a convection dryer at 120° C. for 4 hours.

<Fluorinated Copolymer Dispersion>

The fluorinated copolymer dispersion of the present invention (hereinafter referred to also as the "present dispersion") comprises an aqueous medium and a specific fluorinated copolymer (hereinafter referred to also as a "copolymer (A)") dispersed in the aqueous medium.

The present dispersion preferably further contains a non-fluorinated surfactant.

The present dispersion may contain other components, as the case requires, within a range not impair the effects of the present invention.

(Copolymer A)

The copolymer A has units based on the monomer (a) (hereinafter referred to also as "units (a)") and units based on the monomer (b) (hereinafter referred to also as "units (b)").

Monomer (a): a compound represented by the following formula (1).

$$CH_2\!\!=\!\!CH\!\!-\!\!R^f \quad (1)$$

wherein $R^f$ is a $C_{1-8}$ perfluoroalkyl group.

Monomer (b): a monomer copolymerizable with the monomer (a).

The number of carbon atoms in $R^f$ is preferably from 1 to 6, more preferably from 4 to 6, particularly preferably 6, since it is thereby easy to adjust the emulsified state, whereby conversion to the copolymer A tends to be good, and the water-and-oil repellency of an article treated with the present dispersion containing the copolymer A will be excellent.

$R^f$ is preferably linear.

The monomer (a) may, for example, be $CH_2\!\!=\!\!CH\!\!-\!\!CF_3$, $CH_2\!\!=\!\!CH\!\!-\!\!CF_2CF_3$, $CH_2\!\!=\!\!CH\!\!-\!\!CF_2\,CF_2\,CF_3$, $CH_2\!\!=\!\!CH\!\!-\!\!CF(CF_3)_2$, $CH_2\!\!=\!\!CH\!\!-\!\!CF_2CF_2\,CF_2\,CF_3$, $CH_2\!\!=\!\!CH\!\!-\!\!CF_2\,CF(CF_3)_2$, $CH_2\!\!=\!\!CH\!\!-\!\!C(CF_3)_3$, $CH_2\!\!=\!\!CH\!\!-\!\!CF_2\,CF_2\,CF_2\,CF_2\,CF_3$, $CH_2\!\!=\!\!CH\!\!-\!\!CF_2\,CF_2\,CF(CF_3)_2$, $CH_2\!\!=\!\!CH\!\!-\!\!CF_2\,CF_2\,CF_2CF_2CF_2CF_3$, $CH_2\!\!=\!\!CH\!\!-\!\!CF_2\,CF_2\,CF_2\,CF_2\,CF_2\,CF(CF_3)$, $CH_2\!\!=\!\!CH\!\!-\!\!CF_2\,CF_2\,CF_2\,CF_2\,CF_2\,CF_2CF_3$, etc.

As the monomer (a), $CH_2\!\!=\!\!CH\!\!-\!\!CF_3$, $CH_2\!\!=\!\!CH\!\!-\!\!CF_2CF_3$, $CH_2\!\!=\!\!CH\!\!-\!\!CF(CF_3)_2$, $CH_2\!\!=\!\!CH\!\!-\!\!CF_2\,CF_2\,CF_2\,CF_3$ and $CH_2\!\!=\!\!CH\!\!-\!\!CF_2CF_2CF_2\,CF_2CF_2CF_3$ are preferred, $CH_2\!\!=\!\!CH\!\!-\!\!CF_3$, $CH_2\!\!=\!\!CH\!\!-\!\!CF_2\,CF_3$, $CH_2\!\!=\!\!CH\!\!-\!\!CF_2\,CF_2\,CF_2\,CF_3$ and $CH_2\!\!=\!\!CH\!\!-\!\!CF_2\,CF_2\,CF_2\,CF_2\,CF_2\,CF_3$ are more preferred, and $CH_2\!\!=\!\!CH\!\!-\!\!CF_2\,CF_2\,CF_2CF_3$ and $CH_2\!\!=\!\!CH\!\!-\!\!CF_2\,CF_2\,CF_2\,CF_2\,CF_3$ are further preferred.

As the monomer (a), two or more types may be used in combination.

The monomer (b) is preferably a compound represented by $CH_2\!\!=\!\!CH\text{-}Q$ or $CH_2\!\!=\!\!CHCH_2\text{-}Q$ (hereinafter both may be referred to also as "monomer (b1)") from such a viewpoint that it is easily copolymerized with the monomer (a). Here, Q is a halogen atom, or an organic group in which the binding terminal atom is an oxygen atom, a nitrogen atom or a sulfur atom.

As the organic group being Q in which the binding terminal atom is an oxygen atom, a nitrogen atom or a sulfur atom, for example, in a case where the organic group is an alkyl group, there may be mentioned an alkoxy group, an acyloxy group, a monoalkylamino group, a dialkylamino group, an alkylthio group, etc. Here, an alkoxycarbonyl group is not Q, since the binding terminal atom is not an oxygen atom. As the organic group, in addition to an alkyl group, there may be mentioned a cycloalkyl group, an aryl group, a heterocyclic group, or the like. Also, a heterocyclic ring in which a nitrogen atom or a sulfur atom constituting the ring is the binding terminal atom, such as a hetero ring having a nitrogen atom in the ring (provided that the nitrogen atom in the ring is a binding terminal atom), may also be mentioned.

The organic group for Q may have a halogen atom or a reactive group such as a hydroxy group, a carboxy group, an amino group or an alkylamino group, and may also have, at a portion other than the binding terminal, a linking group such as an etheric oxygen atom, a carbonyloxy group, etc. Further, it may have a polymerizable carbon-carbon double bond. As the reactive group, a hydroxy group is preferred, and it is preferred not to have a polymerizable carbon-carbon double bond.

As the compound represented by $CH_2=CH-Q$, a carboxylic acid vinyl ester, an alkyl vinyl ether, a hydroxyalkyl vinyl ether and a vinyl halide are preferred. As the compound represented by $CH_2=CHCH_2-Q$, a carboxylic acid allyl ester, an alkyl allyl ether and a hydroxyalkyl allyl ether are preferred. The number of carbon atoms of the acyl group in the carboxylic acid vinyl ester or the carboxylic acid allyl ester, is preferably at most 24, and an acyl group having from 2 to 6 carbon atoms is more preferred. It is also preferred to use a carboxylic acid vinyl ester or a carboxylic acid allyl ester having an acyl group having from 2 to 6 carbon atoms, and a carboxylic acid vinyl ester or a carboxylic acid allyl ester having an acyl group having from 10 to 20 carbon atoms in combination.

The number of carbon atoms of the alkyl or hydroxyalkyl in the alkyl vinyl ether, the hydroxyalkyl vinyl ether, the alkyl allyl ether and the hydroxyalkyl allyl ether is preferably from 2 to 6.

The carboxylic acid vinyl ester may, for example, be vinyl acetate, vinyl butyrate, vinyl pivalate, vinyl caproate, vinyl caprylate, vinyl laurate, vinyl stearate, vinyl benzoate, vinyl chloroacetate, or divinyl adipate. As the carboxylic acid vinyl ester, vinyl acetate is particularly preferred from such a viewpoint that it is possible to obtain an article excellent in oil repellency and alcohol repellency.

The vinyl ether may, for example, be methyl vinyl ether, ethyl vinyl ether, n-butyl vinyl ether, iso-butyl vinyl ether, tert-butyl vinyl ether, 4-hydroxybutyl vinyl ether, stearyl vinyl ether, chloromethyl vinyl ether, 2-chloroethyl vinyl ether, chloropropyl vinyl ether, cyclohexyl vinyl ether, ethylene glycol monovinyl ether, or diethylene glycol monovinyl ether.

The carboxylic acid allyl ester may, for example, be allyl acetate, or diallyl adipate.

The allyl ether may, for example, be allyl ethyl ether, diallyl ether, or 1,3-diallyloxy-2-propanol.

The vinyl halide may, for example, be vinyl chloride or vinyl fluoride, and vinyl chloride is preferred.

Other examples of the compound represented by $CH_2=CH-Q$ or $CH_2=CHCH_2-Q$ may, for example, be N-vinylpyrrolidone, N-vinyl-ε-caprolactam and ethyl vinyl sulfide.

As the monomer (b1), from such a viewpoint that copolymerizability with the monomer (a) is good and it is possible to obtain an article excellent in oil repellency and alcohol repellency, a carboxylic acid vinyl ester, a vinyl ether, a vinyl halide and N-vinylpyrrolidone are preferred. As the monomer (b1), a carboxylic acid vinyl ester and a vinyl halide are more preferred.

As specific monomers (b1), from such a viewpoint that it is possible to obtain an article excellent in oil repellency and alcohol repellency, vinyl acetate, vinyl butyrate, vinyl pivalate, vinyl caprylate, vinyl laurate, vinyl stearate, vinyl benzoate, vinyl chloroacetate, ethyl vinyl ether, tert-butyl vinyl ether, 4-hydroxybutyl vinyl ether, vinyl chloride and N-vinylpyrrolidone are preferred; vinyl acetate, vinyl butyrate, vinyl laurate, vinyl stearate, ethyl vinyl ether, tert-butyl vinyl ether, 4-hydroxybutyl vinyl ether, vinyl chloride and N-vinylpyrrolidone are more preferred; and vinyl acetate, vinyl stearate, ethyl vinyl ether, tert-butyl vinyl ether, 4-hydroxybutyl vinyl ether, vinyl chloride and N-vinylpyrrolidone are further preferred.

The copolymer A may have, as units (b), units based on a monomer (b) other than the monomer (b1). A monomer (b) other than the monomer (b1) will be hereinafter referred to as a monomer (b2).

As the copolymer A, a copolymer having only units based on the monomer (b1) as the units (b), and a copolymer having units based on the monomer (b1) and units based on the monomer (b2), are preferred. A preferred copolymer A may have units based on two or more monomers (b1), and in a case where the copolymer A has units based on the monomer (b2), it may have units based on two or more monomers (b2).

The monomer (b2) may, for example, be an olefin, a halogenated olefin other than a vinyl halide, an alkyl (meth) acrylate, a hydroxyalkyl (meth)acrylate, a fluoroalkyl (meth) acrylate, or a perfluoro(alkyl vinyl ether). Specifically, ethylene, propylene, vinylidene chloride, vinylidene fluoride, tetrafluoroethylene, methyl (meth)acrylate, ethyl (meth) acrylate, 2-hydroxyethyl (meth)acrylate, 2-perfluorohexylethyl (meth)acrylate, $CF_2=CFOCF_3$, $CF_2=CFOCF_2\ CF_3$, $CF_2=CFOCF_2\ CF_2\ CF_3$, $CF_2=CFOCF_2\ CF_2\ CF_2\ CF_3$, or $CF_2=CFOCF_2\ CF(CF_3)OCF_2\ CF_2\ CF_3$ may be mentioned.

As the monomer (b2), a (meth)acrylate is preferred. However, the copolymer A preferably has no units based on a (meth)acrylate having a perfluoroalkyl group, from such a viewpoint that it is thereby possible to obtain an article which is further less likely to be susceptible to a decrease in the water-and-oil repellency by alkali, etc., and therefore, as the monomer (b2), a (meth)acrylate containing no fluorine atom is preferred. The (meth)acrylate containing no fluorine atom may, for example, be methyl (meth)acrylate, n-butyl (meth)acrylate, tert-butyl (meth)acrylate, 2-hydroxyethyl (meth)acrylate, lauryl (meth)acrylate, stearyl (meth)acrylate, or behenyl (meth)acrylate. Since Tg of the copolymer A tends to be low and the film-forming property tends to be good, n-butyl (meth)acrylate and 2-hydroxyethyl (meth) acrylate are preferred, and in a case where the article is a textile, since the texture becomes good, lauryl (meth)acrylate, stearyl (meth)acrylate and behenyl (meth)acrylate are preferred.

The proportion of units (a) in the copolymer A is from 20 to 60 mol %, preferably from 30 to 50 mol %, to all units (i.e. the total of units (a) and units (b)) constituting the copolymer A. When the proportion of units (a) is at least the lower limit value in the above range, it is possible to improve the conversion of the monomer components to the copolymer A at the time of polymerization of the monomer components and to make the molecular weight of the copolymer A to be high, and at the same time, an article treated with the present dispersion containing the copolymer A will be excellent in water-and-oil repellency. Further, the copolymer A will be excellent water-dispersibility. When the proportion of units (a) is at most the upper limit value in the above range, it is possible to make the molecular weight of the copolymer A to be high.

The proportion of units (b) in the copolymer A is from 40 to 80 mol %, preferably from 50 to 70 mol %, to all units constituting the copolymer A. When the proportion of units (b) is at least the lower limit value in the above range, it is possible to make the molecular weight of the copolymer A to be high. When the proportion of units (b) is at most the upper limit value in the above range, an article treated with the present dispersion containing the copolymer A will be excellent in water-and-oil repellency. Further, the copolymer A will be excellent in water-dispersibility.

The proportion of units based on the monomer (b1) is preferably from 40 to 80 mol %, more preferably from 50 to 70 mol %, to all units constituting the copolymer A. When the proportion of units based on the monomer (b1) is at least the lower limit value in the above range, it is possible to make the molecular weight of the copolymer A to be high. When the proportion of units based on the monomer (b1) is at most the upper limit value in the above range, an article treated with the present dispersion containing the copolymer A will be excellent in water-and-oil repellency. Further, the copolymer A will be excellent in water-dispersibility.

In a case where a vinyl halide is used as the monomer (b1), the content proportion of units based on the vinyl halide is preferably from 1 to 50 mol %, more preferably from 5 to 45 mol %, further preferably from 8 to 40 mol %, to all units of the units (b).

In a case where the copolymer A has units based on the monomer (b2), the proportion of units based on the monomer (b2) is preferably less than 20 mass %, more preferably less than 10 mass %, to all units in the copolymer A. Within the above range, it is possible to obtain an article which is further less susceptible to a decrease in the water-and-oil repellency by alkali, etc.

The total proportion of units (a) and units based on the monomer (b1) in the copolymer A is preferably at least 80 mass %, more preferably at least 90 mass %, or may be 100 mass %, to all units constituting the copolymer A. Within the above range, it is possible to obtain an article which is further less susceptible to a decrease in the water-and-oil repellency by alkali, etc.

The proportion of units based on each monomer can be calculated by $^1$H-NMR. It may also be calculated on the basis of the charged amount of the monomer in the method for producing the present dispersion, since the monomers remaining in the present dispersion are hardly detected after polymerization of the monomer components in the later described method for producing the present dispersion.

The number average molecular weight of the copolymer A is at least 10,000, preferably at least 11,000, more preferably at least 12,000. The number average molecular weight of the copolymer A is at most 100,000, preferably at most 70,000, more preferably at most 50,000. When the number average molecular weight of the copolymer A is at least the lower limit value in the above range, an article treated with the present dispersion containing the copolymer A will be further excellent in water-and-oil repellency. When the number average molecular weight of the copolymer A is at most the upper limit value in the above range, the copolymer A will be excellent in water-dispersibility.

The mass average molecular weight of the copolymer A is preferably at least 10,000, more preferably at least 20,000, further preferably at least 30,000. The mass average molecular weight of the copolymer A is preferably at most 150,000, more preferably at most 120,000, further preferably at most 100,000. When the mass average molecular weight of the copolymer A is at least the lower limit value in the above range, an article treated with the present dispersion containing the copolymer A will be further excellent in water-and-oil repellency. When the mass average molecular weight of the copolymer A is at most the upper limit value in the above range, the copolymer A will be excellent in water-dispersibility.

It is preferred that the copolymer A does not contain a copolymer A having a number molecular weight of at most 3,000, or if contains, its content is at most 2% to the entire copolymer A. It is more preferred that the copolymer A does not contain a copolymer A having a number molecular weight of at most 3,000. In a case where the copolymer A contains a copolymer A having a number molecular weight of at most 3,000, its content proportion is more preferably at most 1% to the entire copolymer A.

When the copolymer A does not contain a copolymer A having a number molecular weight of at most 3,000 or if contains, its content is within the above range, an article treated with the present dispersion will be further excellent in water-and-oil repellency.

The content proportion of a copolymer A having a number molecular weight of at most 3,000 to the copolymer A, can be calculated, as described in the Examples below, as the proportion (%) of the peak area at the portion where the number molecular weight is at most 3,000 to the peak area of the entire copolymer A, in a chart obtained by measuring, by GPC measurement, the molecular weight of the copolymer A recovered from the present dispersion.

(Aqueous Medium)

The aqueous medium may be water or a mixed medium of water and a water-soluble organic solvent.

As the water-soluble organic solvent, an alcohol (excluding an ether alcohol) and an ether alcohol are preferred. The alcohol may, for example, be tert-butanol, or propylene glycol. The ether alcohol may, for example, be 3-methoxymethylbutanol, dipropylene glycol, dipropylene glycol monomethyl ether, or tripropylene glycol. As the water-soluble organic solvent, from such a viewpoint that compatibility of the copolymer A and the aqueous medium will be improved so that a uniform film may easily be formed on a substrate, an ether alcohol is preferred; and dipropylene glycol, tripropylene glycol and dipropylene glycol monomethyl ether are more preferred.

In a case where the aqueous medium contains a water-soluble organic solvent, the content of the water-soluble organic solvent is preferably from 1 to 80 parts by mass, more preferably from 10 to 60 parts by mass, to 100 parts by mass of water.

(Non-Fluorinated Surfactant)

A non-fluorinated surfactant is a surfactant having no fluorine atom.

As the non-fluorinated surfactant, an anionic surfactant, a nonionic surfactant, a cationic surfactant or an amphoteric surfactant may be mentioned.

As the non-fluorinated surfactant, from the viewpoint of excellent dispersion stability of the present dispersion, a combined use of a nonionic surfactant and a cationic surfactant or an amphoteric surfactant, and a single use of an anionic surfactant, are preferred; and the combined use of a nonionic surfactant and a cationic surfactant is more preferred. From the viewpoint of compatibility with the later-described various additives, the single use of a nonionic surfactant is also preferred.

In the case of the combined use of a nonionic surfactant and a cationic surfactant, the ratio of the nonionic surfactant to the cationic surfactant (nonionic surfactant/cationic surfactant) is preferably from 100/0 to 40/60 (mass ratio), more preferably from 97/3 to 40/60 (mass ratio).

In a specific combination of a nonionic surfactant and a cationic surfactant, the total amount of surfactants to 100 parts by mass of the copolymer A can be made to be at most 5 parts by mass, whereby it is possible to reduce an adverse effect to the water-and-oil repellency of an article treated in the present dispersion, to be caused by the non-fluorinated surfactant.

Examples of the nonionic surfactant may be surfactants s1 to s6 as described in paragraphs [0067] to [0095] of JP-A-2009-215370.

Surfactant s1 is a polyoxyalkylene monoalkyl ether, a polyoxyalkylene monoalkenyl ether, a polyoxyalkylene monoalkapolyenyl ether or a polyoxyalkylene monopolyfluoroalkyl ether. As the surfactant s1, polyoxyethylene oleyl ether is preferred.

Surfactant s2 is a compound having at least one carbon-carbon triple bond and at least one hydroxy group in the molecule. As the surfactant s2, an acetylene glycol ethylene oxide adduct is preferred.

Surfactant s3 is a compound in which polyoxyethylene chains and polyoxyalkylene chains having at least two oxyalkylenes with at least 3 carbon atoms continuously linked, are linked, and both terminals are hydroxy groups. As the surfactant s3, an ethylene oxide propylene oxide polymer is preferred.

As the nonionic surfactant, two or more types may be used in combination.

Examples of the cationic surfactant may be surfactants s7 as described in paragraphs [0096] to [0100] of JP-A-2009-215370.

Surfactants s7 are cationic surfactants of a substituted ammonium salt form.

As the surfactant s7, an ammonium salt in which at least one hydrogen atom bonded to the nitrogen atom is substituted by an alkyl group, an alkenyl group or a polyoxyalkylene chain having a terminal hydroxy group, is preferred, and the compound s71 represented by the formula (s71) is more preferred.

$$[(R^{21})_4N^+].X^- \quad (s71)$$

$R^{21}$ is a hydrogen atom, a $C_{1-22}$ alkyl group, a $C_{2-22}$ alkenyl group, or a polyoxyalkylene chain having a terminal hydroxy group. The four $R^{21}$ may be the same or may be different, but the four $R^{21}$ are not hydrogen atoms at the same time. $X^-$ is a counter ion.

$X^-$ is preferably a chlorine ion, an ethyl sulfate ion, or an acetate ion.

The compound s71 may, for example, be monostearyl trimethyl ammonium chloride, monostearyl dimethyl monoethyl ammonium ethyl sulfate, mono(stearyl) monomethyldi(polyethylene glycol) ammonium chloride, di(tallow alkyl) dimethyl ammonium chloride, or dimethyl mono coconut amine acetate.

As the cationic surfactant, two or more types may be used in combination.

Examples of the amphoteric surfactant may be surfactants s8 as described in paragraphs [0101] to [0102] of JP-A-2009-215370. One type of these may be used alone, or two or more types of them may be used in combination.

Surfactant s8 may be alanine, imidazolinium betaine, an amide betaine or betaine acetate.

As the combination of non-fluorinated surfactants, from such a viewpoint that adverse effects to water-and-oil repellency of an article treated with the present dispersion are little, and from the viewpoint of excellent dispersion stability of the present dispersion, a combination of surfactant s1, surfactant s2 and surfactant s7, or a combination of surfactant s1, surfactant s3 and surfactant s7, or a combination of surfactant s1, surfactant s2 and surfactant s3, is preferred, and the above combination in which the surfactant s7 is compound s71, is more preferred.

(Other Components)

Other components may, for example, be a fluorinated polymer other than the copolymer A, a non-fluorinated polymer, a non-fluorinated water-and-oil repellent, a water-soluble polymer resin (e.g. a hydrophilic polyester and derivatives thereof, a hydrophilic polyethylene glycol and derivatives thereof), a crosslinking agent, an osmotic agent (e.g. a nonionic surfactant of a symmetrical structure having an acetylene group at the center, DISPANOL (registered trademark) series manufactured by NOF Corp.), colloidal silica (e.g. Snowtex (registered trademark) series manufactured by Nissan Chemical Corporation, ADELITE series manufactured by ADEKA CORPORATION), an anti-foaming agent (e.g. Olfine (registered trademark) series manufactured by Nissin Chemical Industry Co., Ltd., FS Anti-foam series manufactured by Toray Dow Corning), a coalescing, an insect repellent, a flame retardant, an anti-static agent (e.g. Delectol series manufactured by Meisei Chemical Works, Ltd.), an anti-wrinkle agent, a softener, and a pH adjusting agent (e.g. diethanolamine, triethanolamine, acetic acid, or citric acid).

When the present dispersion contains a crosslinking agent, the adhesion to a substrate tends to be easily improved. As the crosslinking agent, an isocyanate type crosslinking agent, a methylol type crosslinking agent, a carbodiimide type crosslinking agent and an oxazoline type crosslinking agent are preferred.

The isocyanate type crosslinking agent may, for example, be an aromatic block type isocyanate crosslinking agent, an aliphatic block type isocyanate crosslinking agent, an aromatic non-block type isocyanate crosslinking agent or an aliphatic non-block type isocyanate crosslinking agent. The isocyanate type crosslinking agent is preferably a water-dispersible type emulsified by a surfactant, or a self water-dispersible type having a hydrophilic group.

The methylol type crosslinking agent may, for example, be a condensate or precondensate of urea or melamine with formaldehyde, a methylol-dihydroxy ethylene-urea or its derivatives, a methylol-ethylene-urea, a methylol-propylene-urea, a methylol-triazone, a dicyandiamide-formaldehyde condensate, a methylol-carbamate, a methylol-(meth)acrylamide, or their polymers.

The carbodiimide type crosslinking agent is a polymer having carbodiimide groups in the molecule, and is a crosslinking agent showing an excellent reactivity with carboxy groups, amino groups or active hydrogen groups of the substrate, etc.

The oxazoline type crosslinking agent is a polymer having oxazoline groups in the molecule, and is a crosslinking agent showing an excellent reactivity with carboxy groups of the substrate, etc.

Other crosslinking agents may, for example, be divinyl sulfone, a polyamide and its cationic derivatives, a polyamine and its cationic derivatives, epoxy derivatives of diglycidyl glycerol, etc., halide derivatives such as (epoxy-2,3-propyl) trimethylammonium chloride, N-methyl-N-(epoxy-2,3-propyl) morpholinium chloride, etc., a pyridinium salt of chloromethyl ether of ethylene glycol, a polyamine-polyamide-epichlorohydrin resin, a polyvinyl alcohol and its derivatives, a polyacrylamide and its derivatives, and a glyoxal resin type anticrease agent.

In a case where the present dispersion contains a methylol type crosslinking agent or a glyoxal resin type anticrease agent, it is preferred to contain a catalyst as an additive. As a preferred catalyst, for example, an inorganic amine salt or an organic amine salt may be mentioned. The inorganic amine salt may, for example, be ammonium chloride. The organic amine salt may, for example, be an amino alcohol hydrochloride or a semicarbazide hydrochloride. The amino alcohol hydrochloride may, for example, be monoethanolamine hydrochloride, diethanolamine hydrochloride, triethanolamine hydrochloride, or 2-amino-2-methylpropanol hydrochloride.

(Proportions of Respective Components)

The solid content concentration in the present dispersion is preferably from 25 to 70 mass %, more preferably from 30 to 60 mass %, immediately after production of the present dispersion.

The total amount of non-fluorinated surfactants in the present dispersion is preferably from 1 to 6 parts by mass to 100 parts by mass of the copolymer A, immediately after production of the present dispersion.

The solid content concentration in the present dispersion is, at the time of being used for treatment of a substrate, preferably from 0.1 to 7 mass %, more preferably from 0.2 to 5 mass %.

The concentration of the crosslinking agent in the present dispersion is, at the time of being used for treatment of a substrate, preferably from 0.1 to 10 mass %.

Advantageous Effects

In the present dispersion as described above, the copolymer A is dispersed in an aqueous medium, whereby an impact to the environment by an organic solvent is little.

Further, in the present dispersion, the copolymer A has units (a), whereby the water-and-oil repellency of an article treated with the present dispersion is less likely to be reduced by alkali, etc.

And, in the present dispersion, the ratio of units (a) and units (b) constituting the copolymer A is within a specific range, whereby an article treated with the present dispersion will be excellent in water-and-oil repellency, the copolymer A will be excellent in water-dispersibility, and it is possible to make the molecular weight of the copolymer A to be high.

<Method for Producing Fluorinated Copolymer Dispersion>

The method for producing the present dispersion is a method of obtaining the present dispersion by polymerizing, in an emulsion comprising an aqueous medium, monomer components, a non-fluorinated surfactant and a polymerization initiator, said monomer components. By employing such an emulsion polymerization method, without using a solvent other than the aqueous medium, it is possible to improve the conversion of the monomer components to the copolymer A, and at the same time, it is possible to make the number average molecular weight of the obtainable copolymer A to be high.

The monomer components comprise the monomer (a) and the monomer (b).

The proportion of the monomer (a) is from 20 to 60 mol %, preferably from 30 to 50 mol %, to the total of the monomer components. When the proportion of the monomer (a) is at least the lower limit value in the above range, it is possible to improve the conversion of the monomer components to the copolymer A at the time of polymerization of the monomer components, and at the same time, it is possible to make the molecular weight of the copolymer A to be high, and an article treated with the present dispersion containing the copolymer A will be excellent in water-and-oil repellency. Further, the copolymer A will be excellent in water-dispersibility. When the proportion of the monomer (a) is at most the upper limit value in the above range, it is possible to make the molecular weight of the copolymer A to be high.

In the case of using a vinyl halide as the monomer (b), the content proportion of the vinyl halide is preferably from 1 to 50 mol %, more preferably from 5 to 45 mol %, further preferably from 8 to 40 mol %, to the monomer (b). Within the above range, the water-and-oil repellency of an article treated with the present dispersion containing the copolymer A will be more excellent.

The total proportion of the monomer (a) and the monomer (b1) is preferably at least 80 mass %, more preferably at least 90 mass %, or may be 100 mass %, to the total of the monomer components. Within the above range, it is possible to obtain an article, of which the water-and-oil repellency is further less likely to be reduced by alkali, etc.

In a case where the monomer components contain a monomer (b2), the proportion of the monomer (b2) is preferably less than 20 mass %, more preferably less than 10 mass %, or may be 0 mass %, to the total of the monomer components. Within the above range, it tends to be easy to obtain an article, of which the water-and-oil repellency is further less likely to be reduced by alkali, etc.

The polymerization initiator may, for example, be a thermal polymerization initiator, a photopolymerization initiator, a radiation polymerization initiator, a radical polymerization initiator, or an ionic polymerization initiator, and a radical polymerization initiator is preferred. As the radical polymerization initiator, for example, an azo polymerization initiator, a peroxide polymerization initiator or a redox initiator is used depending on the polymerization temperature. As the radical polymerization initiator, an azo compound is preferred, and a salt of an azo compound is more preferred. The polymerization temperature is preferably from 20 to 150° C.

The amount of the polymerization initiator to be added, is preferably from 0.1 to 5 parts by mass, more preferably from 0.1 to 3 parts by mass, to 100 parts by mass of the monomer components.

At the time of polymerizing the monomer components, a molecular weight modifier may be used. As the molecular weight modifier, for example, an aromatic compound, a mercapto alcohol, a mercapto carboxylic acid or an alkyl mercaptan is preferred, and a mercaptocarboxylic acid or an alkyl mercaptan is more preferred. As the molecular weight modifier, for example, mercaptoethanol, mercaptopropionic acid, n-octyl mercaptan, n-dodecyl mercaptan, tert-dodecyl mercaptan, stearyl mercaptan, or α-methylstyrene dimer ($CH_2$=$C(Ph)CH_2C(CH_3)_2Ph$, wherein Ph is a phenyl group) may be mentioned.

The amount of the molecular weight modifier to be added, is preferably from 0 to 5 parts by mass, more preferably from 0 to 2 parts by mass, to 100 parts by mass of the monomer components.

The emulsion is prepared by mixing an aqueous medium, monomer components and a non-fluorinated surfactant, followed by dispersing by a homogenizer, a high-pressure emulsifying machine or the like, and then adding a polymerization initiator.

The concentration of the monomer components in the emulsion is preferably from 40 to 70 mass %, more preferably from 45 to 60 mass %. When the concentration of the monomer components in the emulsion is within the above range, it is possible to improve the conversion of the monomer components to the copolymer A at the time of polymerization of the monomer components, and at the same time, it is possible to make the molecular weight of the copolymer A to be sufficiently high.

The total amount of non-fluorinated surfactants in the emulsion is preferably from 1 to 6 parts by mass, to 100 parts by mass of the monomer components. When the total amount of non-fluorinated surfactants is at least the lower limit value in the above range, the emulsion will be excellent in dispersion stability. When the total amount of non-fluorinated surfactants is at most the upper limit value in the above range, an adverse effect to the water-and-oil repellency of an article treated with the present dispersion will be little.

An emulsion of the copolymer A obtained by polymerizing the monomer components in the emulsion liquid may be used, as it is, as the present dispersion, or may be diluted with an aqueous medium to have its solid content concentration adjusted and then used as the present dispersion. To the present dispersion, other components may further be added.

The conversion of the monomer components to the copolymer A at the time of completion of the polymerization is preferably at least 80%, more preferably at least 90%. By making the conversion to be high, the molecular weight of the copolymer A will also be high, and the water-and-oil repellency will also become good. Further, by making the conversion to be high, it is possible to suppress a decrease in performance by the residual monomers, and at the same time, the amount of fluorine atoms contained in the copolymer A becomes large, whereby the water-and-oil repellency will be good.

In order to make the conversion to be at least 80%, it is preferred to conduct the optimization of the emulsion composition, and the optimization of the polymerization time.

Advantageous Effects

In the method for producing the present dispersion as described above, the monomer components are polymerized in the emulsion, whereby it is possible to obtain the present dispersion which presents little impact to the environment by an organic solvent.

Further, in the method for producing the present dispersion, since the monomer components are polymerized in the emulsion, it is possible to make the molecular weight of the copolymer A to be high. Therefore, it is possible to produce the present dispersion which is capable of producing an article excellent in water-and-oil repellency.

Further, in the method for producing the present dispersion, since the monomer components containing the monomer (a) are polymerized, it is possible to produce the present dispersion capable of producing an article, of which the water-and-oil repellency is less likely to be reduced by alkali, etc.

And, in the method for producing the present dispersion, since the ratio of the monomer (a) and the monomer (b) contained in the monomer components is within a specific range, it is possible to make the conversion of the monomer components to the polymer A to be high; it is possible to produce an article excellent in water-and-oil repellency; the copolymer A will be excellent in water-dispersibility; and it is possible to produce the present dispersion containing the copolymer A having a high molecular weight.

<Article>

The article of the present invention is an article treated with the present dispersion.

The article to be treated with the present dispersion may, for example, be fibers, fiber fabrics, fiber knitted products, nonwoven fabrics, glass, paper, wood, leather, artificial leather, stone, concrete, ceramics, metals, metal oxides, ceramics products, resin molded products, porous resins, or porous fibers. A porous resin may be used, for example, as a filter. The material for the porous resin may, for example, be polypropylene, polyethylene terephthalate, or polytetrafluoroethylene. The material for the porous fibers may, for example, be glass fibers, cellulose nanofibers, carbon fibers, or cellulose acetate.

As a treating method, for example, a method of applying or impregnating the present dispersion to an article by a known coating method, followed by drying, may be mentioned.

The article of the present invention is suitable for a filter for dust collection. That is, a filter treated with the present dispersion is excellent in oil repellency, whereby oil stains at the time of dust collection can be suppressed. Further, a filter treated with the present dispersion is excellent in water repellency, whereby the water pressure resistance is high. Therefore, after the dust collection, dirt tends to remain near the surface, and thus, when washed with water, dirt can be easily removed. Thus, a filter treated with the present dispersion can be repeatedly used by washing with water. Furthermore, of a filter treated with the present dispersion, the water-and-oil repellency is less likely to be reduced by alkali, etc., whereby it can be repeatedly used in applications where the filter is washed with hot alkali.

Advantageous Effects

With respect to the article of the present invention as described above, it is excellent in water-and-oil repellency, since it is treated with the present dispersion containing the copolymer A having a high molecular weight.

Further, since the article of the present invention is treated with the present dispersion containing the copolymer A having units (a), the water-and-oil repellency is less likely to be reduced by alkali, etc.

EXAMPLES

In the following, the present invention will be described in detail with reference to Examples, but the present invention is not limited thereto.

Ex. 1 to 22 and Ex. 28 to 31 are Examples of the present invention, and Ex. 23 to 27 are Comparative Examples.

(Conversion)

From the theoretical value of the solid content concentration of a fluorinated copolymer emulsion calculated from the charged amounts of the raw materials, and the measured value of the solid content concentration of the fluorinated copolymer emulsion, the conversion of the monomers to the fluorinated copolymer was obtained by the measured value/theoretical value×100. The conversion being at least 90% was deemed to be ○ (good), it being at least 80% and less than 90% was deemed to be Δ (acceptable), and it being less than 80% was deemed to be x (not acceptable).

(Proportions of Units (a) and Units (b))

After removing the surfactants and solvent from a fluorinated copolymer emulsion, proportions of units (a) and units (b) were calculated by $^1$H-NMR.

(Molecular Weight)

With respect to a fluorinated copolymer emulsion, the fluorinated copolymer was recovered as follows. 6 g of the fluorinated copolymer emulsion was dropwise added to 60 g of 2-propanol (hereinafter referred to as "IPA"), followed by stirring to let a solid be precipitated. After centrifugal separation at 3,000 rpm for 5 minutes, the solid was separated. Again, 12 g of IPA was added, followed by stirring well. After centrifugal separation at 3,000 rpm for 5 minutes, the solid was separated from the supernatant and vacuum-dried overnight at 35° C. to obtain a fluorinated copolymer.

With respect to a polymer obtained by bulk polymerization, it was taken out from the container, and the fluorinated copolymer was recovered.

The recovered fluorinated copolymer was dissolved in a mixed solvent of a fluorinated solvent (manufactured by Asahi Glass Company Ltd., AK-225)/tetrahydrofuran (hereinafter referred to as "THF")=6/4 (volume ratio), to obtain a solution with a solid content concentration of 0.5 mass %, which was passed through a 0.2 µm filter to obtain an analytical sample. With respect to the analytical sample, the number average molecular weight (Mn) and the mass average molecular weight (Mw) were measured by GPC measurements. Further, the proportion of a fluorinated copolymer having a molecular weight of at most 3,000 in the fluorinated copolymer, was calculated by using the formula "(area size of the portion with the molecular weight of at most 3,000 at the peak of the fluorinated copolymer)/(area size of the entire peak of the fluorinated copolymer)×100 (%)". Said proportion being at most 2% was identified by "○", and it being more than 2% was identified by "x", in the Table. The measurement conditions are as follows.

Apparatus: manufactured by Tosoh Corporation, HLC-8320GPC,

Column: manufactured by Polymer laboratories Ltd., MIXED-C 300×7.5 mm 5 µm,

Mobile phase: AK-225/THF=6/4 (volume ratio),
Flow rate: 1.0 mL/min,
Oven temperature: 37° C.,
Sample concentration: 1.0 mass %,
Injection volume: 50 µL,
Detector: RI, Molecular weight standards: polymethyl methacrylates (Mp=2136000, 955000, 569000, 332800, 121600, 67400, 31110, 13300, 7360, 1950, 1010, and 550).

(Contact Angle of Water)

In accordance with JIS R3257: 1999 "Wettability test method for a substrate glass surface", water droplets were left to stand at five positions on the surface of an article, and with respect to each water droplet, the contact angle of water was measured by a sessile drop method. Water droplets were about 2 µL/droplet, and the measurement was carried out at 20° C. The contact angle of water is shown by the mean value of the measured values at the five positions. The contact angle of water becomes an index for the water repellency of the article.

(Contact Angle of n-Hexadecane)

In accordance with JIS R3257: 1999 "Wettability test method for a substrate glass surface", liquid droplets of n-hexadecane were left to stand at five positions on the surface of an article, and with respect to each liquid droplet, the contact angle of n-hexadecane was measured by a sessile drop method. The liquid droplets were about 2 µL/droplet, and the measurement was carried out at 20° C. The contact angle of n-hexadecane is shown by the mean value of the measured values at the five positions. The contact angle of n-hexadecane becomes an index for the oil repellency of the article.

(Performance after Hot Alkali Treatment)

A fluorinated copolymer emulsion was diluted with distilled water to adjust the solid content concentration to be 1.0 mass %, and then, a trimethylol melamine resin (manufactured by Dainippon Ink and Chemicals, Incorporated, BECKAMINE M-3) being a thermosetting agent and an organic amine salt catalyst (manufactured by Dainippon Ink and Chemicals, Incorporated, Catalyst ACX) being a thermosetting catalyst, were, respectively, added so that each concentration became to be 0.3 mass %, to obtain a water repellent composition.

To the water repellent composition, a dyed cotton fabric was immersed and then squeezed so that the wet pick-up became 60 mass %. This was dried at 110° C. for 90 seconds and then dried at 170° C. for 60 seconds, to obtain a test cloth. The test cloth was immersed for 24 hours in a 0.1 mol/L sodium hydroxide solution at 50° C. The hot alkali-treated test cloth was dried at 110° C. for 90 seconds. With respect to the test cloth before and after the hot alkali treatment, the contact angle of water was measured. A case where the contact angle of water of the test cloth after the hot alkali treatment is less than 60 degrees was judged to be "x" (not acceptable); a case where the contact angle of water of the test cloth after the hot alkali treatment is at least 60 degrees, and the proportion of the reduction in contact angle after the treatment is at least 30% as compared to the contact angle before the hot alkali pretreatment, was judged to be Δ (acceptable); and a case where the contact angle of water of the test cloth before and after the hot alkali treatment is at least 60 degrees, and the proportion of the reduction in contact angle after the treatment is less than 30% as compared to the contact angle before the hot alkali treatment, was judged to be ○ as (good).

(Wash Durability of Water-and-Oil Repellency and Water Repellency)

The fluorinated copolymer emulsion was diluted with distilled water to adjust the solid content concentration to be 1.2 mass %, and then, an isocyanate crosslinking agent (manufactured by Meisei Chemical Works, Ltd., Meikanate TP-10) was added so that its concentration became 1 mass %, to obtain a water-and-oil repellent composition.

In the water-and-oil repellent composition, a PET taffeta or a nylon high density taffeta was immersed and then squeezed so that the wet pick-up became from 25 to 40 mass % in the PET taffeta, or from 45 to 50 mass % in the Ny-high density taffeta. This was heated at 110° C. for 90 seconds, then dried at 170° C. for 60 seconds, and then left to stand still overnight in a room at 23° C. under a humidity of 50%, to obtain a test cloth.

The oil repellency was evaluated in grades listed in Table 1 in accordance with the test method of AATCC-TM118-1966.

The water repellency was evaluated in grades of five stages of from 1 to 5 in accordance with the spray test of JIS L1092-1998. The larger the grade, the better the water repellency.

With respect to the test cloth subjected to evaluation of the above-mentioned water repellency, washing was repeated 20 times in accordance with the water washing method of JIS L0217 Appendix 103. After the washing, it was air-dried overnight in a room at 23° C. under a humidity of 50%, whereupon the above-mentioned water repellency was evaluated.

TABLE 1

| Oil repellency grades | Test solution | Surface tension (25° C.) [mN/m] |
|---|---|---|
| 8 | n-heptane | 19.8 |
| 7 | n-octane | 21.4 |

TABLE 1-continued

| Oil repellency grades | Test solution | Surface tension (25° C.) [mN/m] |
|---|---|---|
| 6 | n-decane | 23.5 |
| 5 | n-dodecane | 24.7 |
| 4 | n-tetradecane | 26.4 |
| 3 | n-hexadecane | 27.3 |
| 2 | Nujol/hexadecane (mass ratio = 65/35) | 29.6 |
| 1 | Nujol | 31.2 |
| 0 | One less than 1 | — |

(Monomer (a))

C8OLF: $CH_2=CH-CF_2CF_2CF_2CF_2CF_2CF_2CF_2CF_3$ (manufactured by Tokyo Kasei Kogyo Co., Ltd.).

C6OLF: $CH_2=CH-CF_2CF_2CF_2CF_2CF_2CF_3$ (manufactured by Tokyo Kasei Kogyo Co., Ltd.).

C4OLF: $CH_2=CH-CF_2CF_2CF_2CF_3$ (manufactured by Tokyo Kasei Kogyo Co., Ltd.).

(Monomer (b))

AcV: vinyl acetate (manufactured by Tokyo Kasei Kogyo Co., Ltd.).

EVE: ethyl vinyl ether (manufactured by Tokyo Kasei Kogyo Co., Ltd.).

t-BVE: tert-butyl vinyl ether (manufactured by BASF).

4-HBVE: 4-hydroxybutyl vinyl ether (manufactured by Wako Pure Chemical Industries, Ltd.).

PV: vinyl pivalate (manufactured by Tokyo Kasei Kogyo Co., Ltd.).

STV: vinyl stearate (manufactured by Tokyo Kasei Kogyo Co., Ltd.).

N-VP: N-vinylpyrrolidone (manufactured by Tokyo Kasei Kogyo Co., Ltd.).

VCM: $CH_2=CHCl$ (manufactured by Yokohama Chemical Co., Ltd.).

C6FMA: $CH_2=C(CH_3)C(O)OCH_2CH_2CF_2CF_2CF_2CF_2CF_2CF_3$

BeA: behenyl acrylate (manufactured by Tokyo Kasei Kogyo Co., Ltd.).

2HEMA: 2-hydroxyethyl methacrylate (manufactured by Tokyo Kasei Kogyo Co., Ltd.).

(Media)

Water: ion-exchanged water.

DPG: dipropylene glycol.

(Non-Fluorinated Surfactants)

E120: A 10 mass % aqueous solution of polyoxyethylene lauryl ether (ethylene oxide about 12 mol adduct, manufactured by Kao Corporation, Emulgen 120).

E430: A 10 mass % aqueous solution of polyoxyethylene oleyl ether (ethylene oxide about 30 mol adduct, product name of Kao Corporation: Emulgen 430).

P104: A 10 mass % aqueous solution of ethylene oxide-propylene oxide polymer (oxyethylene group content: 40 mass %, product name of NOF Corp.: Plonon #104).

P204: A 10 mass % aqueous solution of ethylene oxide-propylene oxide polymer (oxyethylene group content: 40 mass %, product name of NOF Corp.: Plonon #204).

LC18-63: One having a 63 mass % water and isopropyl alcohol solution of monostearyl trimethyl ammonium chloride (product name of Lion Corporation: Lipoquad 18-63) diluted with water to 10 mass %.

SFY420: 2,4,7,9-tetramethyl-5-decyne-4,7-diol ethylene oxide 1.3 mol adduct (product name of Nissin Chemical Industry Co., Ltd.: Surfynol 420).

(Polymerization Initiator)

VA-061A: One obtained by mixing 2,2'-azobis[2-(2-imidazolin-2-yl)propane] (manufactured by Wako Pure Chemical Industries, Ltd., VA-061) and a 8 mass % acetic acid aqueous solution in a mass ratio of 1:9.

Ex. 1 to 22

In a 1 L autoclave equipped with a stirrer, monomers, media and non-fluorinated surfactants of the types and charged amounts as shown in Tables 2 and 3 were put and stirred to obtain a mixture. The mixture was put into a homogenizer and dispersed to obtain an emulsion.

The emulsion was put into a stainless steel autoclave and a polymerization initiator of the type and charged amount as shown in Tables 2 and 3 was added. The autoclave was purged with nitrogen, the temperature was raised to 45° C., and the monomer components were polymerized for 24 hours to obtain a fluorinated copolymer emulsion. The solid content concentration of the fluorinated copolymer emulsion, the conversion, Mn and Mw of the fluorinated copolymer, and the proportion of a polymer having a molecular weight of at most 3,000, are shown in Tables 2 and 3.

The fluorinated copolymer emulsion was diluted with distilled water to adjust the solid content concentration to 1.0 mass % to obtain a fluorinated copolymer dispersion.

The fluorinated copolymer dispersion was applied to the surface of a glass substrate, followed by drying at 105° C. for 3 minutes, to obtain an article for evaluation. As the glass substrate, ASLAB, SUPER GRADE MICROSCOPE SLIDES (product name of THICK Inc., longitudinal: 25 mm, horizontal: 75 mm, thickness: 1.0 to 1.2 mm) was used, and for the application to the surface of the glass substrate, a dip coater was used. With respect to the article, the contact angle was evaluated according to the method as described above. The measurement results of the contact angle and the performance after the above hot alkali treatment are shown in Tables 2 and 3.

Ex. 23, 24, 26 to 28, 30 and 31

A fluorinated copolymer emulsion was obtained in the same manner as in Ex. 1, except that the types and charged amounts of raw materials were changed to the types and charged amounts as shown in Table 4. The solid content concentration of the fluorinated copolymer emulsion, the conversion, Mn and Mw of the fluorinated copolymer, and the presence or absence of a polymer having a molecular weight of at most 3,000, are shown in Table 4. However, in Ex. 24, since the conversion was defective, the measurement of the molecular weight was not carried out, and the performance of the article was also not evaluated.

With respect to Ex. 23, 26 to 28, 30 and 31, an article was obtained in the same manner as in Ex. 1, except that the fluorinated copolymer emulsion was changed. With respect to the article, the contact angle was measured in the same manner as described above. The measurement results of the contact angle and the results of evaluation of the performance after the above hot alkali treatment, are shown in Table 4.

In Ex. 26 and 28, the water-and-oil repellency and the washing durability of water repellency were evaluated. The results are shown in Table 5.

Ex. 25 and 29

In a 1 L autoclave equipped with a stirrer, monomers other than VCM, media and non-fluorinated surfactants were put in the charged amounts as shown in Table 4, followed by stirring to obtain a mixed liquid. The mixed liquid was put in a homogenizer and dispersed to obtain an emulsion.

The emulsion was put in a stainless steel autoclave, and a polymerization initiator of the type and charged amount as shown in Table 4 was added. After the autoclave was purged with nitrogen, VCM in the charged amount as shown in Table 4 was introduced; the temperature was raised to 45° C.; and the monomer components were polymerized for 72 hours, to obtain a fluorinated copolymer emulsion. The solid content concentration of the fluorinated copolymer emulsion, the conversion, Mn and Mw of the fluorinated copolymer, and the proportion of a polymer having a molecular weight of at most 3,000, are shown in Table 4.

An article was obtained in the same manner as in Ex. 1 except that the fluorinated copolymer emulsion was changed. With respect to the article, the contact angle was measured in the same manner as described above. The measurement results of the contact angle and the results of evaluation of the performance after the above hot alkali treatment, are shown in Table 4. With respect to Ex. 29, the water-and-oil repellency and the washing durability of water repellency were evaluated. The results are shown in Table 5.

TABLE 2

| Charged amount [g] | | | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|---|
| Monomers | (a) | C8OLF | — | — | — | — | — | — | — | — | — | — | — |
| | | C6OLF | 130 | 100 | 167 | 138 | 109 | 160 | 125 | 120 | 115 | 105 | 160 |
| | (b) | AcV | 65 | 95 | 28 | — | — | — | — | — | — | — | — |
| | | EVE | — | — | — | 57 | 86 | 27 | — | — | — | — | — |
| | | t-BVE | — | — | — | — | — | — | 70 | — | — | — | — |
| | | 4-HBVE | — | — | — | — | — | — | — | 75 | — | — | — |
| | | PV | — | — | — | — | — | — | — | — | 80 | — | — |
| | | STV | — | — | — | — | — | — | — | — | — | 95 | — |
| | | N-VP | — | — | — | — | — | — | — | — | — | — | 35 |
| Media | | Water | 119 | 119 | 119 | 119 | 119 | 119 | 119 | 119 | 119 | 119 | 119 |
| | | DPG | 34 | 34 | 34 | 34 | 34 | 34 | 34 | 34 | 34 | 34 | 34 |
| Non-fluorinated surfactants | | E430 | 19 | 19 | 19 | 19 | 19 | 19 | 19 | 19 | 19 | 19 | 19 |
| | | P204 | 10 | 10 | 10 | 10 | 10 | 10 | 10 | 10 | 10 | 10 | 10 |
| | | LC18-63 | 4.9 | 4.9 | 4.9 | 4.9 | 4.9 | 4.9 | 4.9 | 4.9 | 4.9 | 4.9 | 4.9 |
| Polymerization initiator | | VA-061A | 19.6 | 19.6 | 19.6 | 19.6 | 19.6 | 19.6 | 19.6 | 19.6 | 19.6 | 19.6 | 19.6 |
| Emulsified liquid | Concentration of monomer components [mass %] | | 48.6 | 48.6 | 48.6 | 48.6 | 48.6 | 48.6 | 48.6 | 48.6 | 48.6 | 48.6 | 48.6 |
| Emulsion | Solid content concentration [%] | (Theoretical value) | 50.3 | 50.3 | 50.3 | 50.3 | 50.3 | 50.3 | 50.3 | 50.3 | 50.3 | 50.9 | 49.8 |
| | | (Measured value) | 50 | 49.8 | 48.8 | 50 | 49.7 | 49.6 | 48.5 | 47.7 | 47.9 | 49.6 | 49.8 |
| Fluorinated polymer | Conversion | % | ○ | ○ | ○ | ○ | ○ | ○ | ○ | ○ | ○ | ○ | ○ |
| | Proportions of respective units [mol %] | Units (a) | 33 | 20.8 | 59.7 | 33.5 | 20.9 | 59.6 | 34 | 34.9 | 34.7 | 49.8 | 59.5 |
| | | Units (b) | 67 | 79.2 | 40.3 | 66.5 | 79.1 | 40.4 | 66 | 65.1 | 65.3 | 50.2 | 40.5 |
| | Molecular weights | Mn | 28000 | 25000 | 20000 | 26000 | 24000 | 20000 | 30000 | 27000 | 30000 | 23000 | 31000 |
| | | Mw | 52000 | 48000 | 44000 | 50000 | 48000 | 35000 | 51000 | 53000 | 56000 | 46000 | 52000 |
| | Proportion of polymer having a molecular weight of at most 3000 | | ○ | ○ | ○ | ○ | ○ | ○ | ○ | ○ | ○ | ○ | ○ |
| Article | Contact angle [°] | Water | 108 | 98 | 115 | 110 | 100 | 115 | 110 | 98 | 108 | 109 | 95 |
| | | n-hexadecane | 66 | 58 | 70 | 60 | 55 | 62 | 62 | 66 | 68 | 56 | 63 |
| | Performance after heat alkali treatment | Water contact angle [°] | ≥60 | ≥60 | ≥60 | ≥60 | ≥60 | ≥60 | ≥60 | ≥60 | ≥60 | ≥60 | ≥60 |
| | | Decrease in contact angle [%] | <30 | <30 | <30 | <30 | <30 | <30 | <30 | <30 | <30 | <30 | <30 |
| | | Judgement | ○ | ○ | ○ | ○ | ○ | ○ | ○ | ○ | ○ | ○ | ○ |

TABLE 3

| Charged amount [g] | | | Ex. 12 | Ex. 13 | Ex. 14 | Ex. 15 | Ex. 16 | Ex. 17 | Ex. 18 | Ex. 19 | Ex. 20 | Ex. 21 | Ex. 22 |
|---|---|---|---|---|---|---|---|---|---|---|---|---|---|
| Monomers | (a) | C8OLF | — | — | — | — | — | — | — | — | — | — | — |
| | | C6OLF | 130 | 130 | 130 | 130 | — | — | 130 | 130 | 130 | 130 | 150 |
| | | C4OLF | — | — | — | — | 120 | 120 | — | — | — | — | — |
| | (b) | AcV | 59 | 63 | 60 | 58 | 75 | 58 | 65 | 65 | 65 | 65 | 55 |
| | | PV | — | — | 7 | 7 | — | 8 | — | — | — | — | — |
| | | N-VP | 6 | 3 | 3 | 7 | — | 7 | — | — | — | — | — |
| Media | | Water | 119 | 119 | 119 | 119 | 119 | 119 | 261 | 15 | 170 | 20 | 119 |
| | | DPG | 34 | 34 | 34 | 34 | 34 | 34 | 75 | 5 | 34 | 34 | 34 |

TABLE 3-continued

| Charged amount [g] | | | Ex. 12 | Ex. 13 | Ex. 14 | Ex. 15 | Ex. 16 | Ex. 17 | Ex. 18 | Ex. 19 | Ex. 20 | Ex. 21 | Ex. 22 |
|---|---|---|---|---|---|---|---|---|---|---|---|---|---|
| Non-fluorinated surfactants | E430 | | 19 | 19 | 37 | 37 | 19 | 37 | 19 | 19 | 19 | 19 | 19 |
| | P204 | | 10 | 10 | 19 | 19 | 10 | 19 | 10 | 10 | 10 | 10 | 10 |
| | LC18-63 | | 4.9 | 4.9 | 9 | 9 | 5 | 9 | 4.9 | 4.9 | 4.9 | 4.9 | 4.9 |
| | SFY420 | | — | — | 3.8 | 3.8 | — | 3.8 | — | — | — | — | — |
| Polymerization initiator | VA-061A | | 19.6 | 19.6 | 19.6 | 19.6 | 19.6 | 19.6 | 19.6 | 19.6 | 19.6 | 19.6 | 19.6 |
| Emulsified liquid | Concentration of monomer components [mass %] | | 48.6 | 48.7 | 45.3 | 45.6 | 48.6 | 44.4 | 31.7 | 72.6 | 43.1 | 64.5 | 49.8 |
| Emulsion | Solid content concentration [%] | (Theoretical value) | 50.3 | 50.4 | 48.4 | 48.6 | 50.2 | 50.5 | 34.5 | 75.1 | 43 | 65 | 51.5 |
| | | (Measured value) | 50 | 49.6 | 46.5 | 46.5 | 49.8 | 48.6 | 26.7 | 63 | 35.8 | 55.2 | 49.9 |
| Fluorinated polymer | Conversion | % | ○ | ○ | ○ | ○ | ○ | ○ | Δ | Δ | Δ | Δ | ○ |
| | Proportions of respective units [mol %] | Units (a) | 34 | 33.1 | 32.5 | 32.2 | 35.9 | 37.9 | 33.2 | 33.2 | 33 | 20.8 | 40 |
| | | Units (b) | 66 | 66.9 | 67.5 | 67.8 | 64.1 | 62.1 | 66.8 | 66.8 | 67 | 79.2 | 60 |
| | Molecular weights | Mn | 30000 | 28000 | 28000 | 28000 | 20000 | 22000 | 28000 | 21000 | 20000 | 22000 | 13000 |
| | | Mw | 52000 | 52000 | 51000 | 51000 | 42000 | 43000 | 45000 | 43000 | 45000 | 47000 | 28000 |
| | Proportion of polymer having a molecular weight of at most 3000 | | ○ | ○ | ○ | ○ | ○ | ○ | ○ | ○ | ○ | ○ | ○ |
| Article | Contact angle [°] | Water | 104 | 106 | 103 | 100 | 86 | 83 | 91 | 90 | 102 | 101 | 112 |
| | | n-hexadecane | 66 | 66 | 62 | 60 | 45 | 42 | 58 | 55 | 66 | 67 | 71 |
| | Performance after heat alkali treatment | Water contact angle [°] | ≥60 | ≥60 | ≥60 | ≥60 | ≥60 | ≥60 | ≥60 | ≥60 | ≥60 | ≥60 | ≥60 |
| | | Decrease in contact angle [%] | <30 | <30 | <30 | <30 | <30 | <30 | <30 | <30 | <30 | <30 | <30 |
| | | Judgement | ○ | ○ | ○ | ○ | ○ | ○ | ○ | ○ | ○ | ○ | ○ |

TABLE 4

| Charged amount [g] | | | Ex. 23 | Ex. 24 | Ex. 25 | Ex. 26 | Ex. 27 | Ex. 28 | Ex. 29 | Ex. 30 | Ex. 31 |
|---|---|---|---|---|---|---|---|---|---|---|---|
| Monomers | (a) | C8OLF | — | — | — | — | — | — | — | 152 | — |
| | | C6OLF | 85 | 168 | — | 130 | 130 | 142 | 147 | — | 145 |
| | (b) | AcV | — | — | — | 65 | 65 | 54 | 37 | 44 | 37 |
| | | EVE | 100 | 27 | — | — | — | — | — | — | — |
| | | VCM | — | — | 55 | — | — | — | 13 | — | — |
| | | C6FMA | — | — | 28 | — | — | — | — | — | — |
| | | BeA | — | — | 53 | — | — | — | — | — | — |
| | | 2-HEMA | — | — | 1.4 | — | — | — | — | — | — |
| Media | | Water | 119 | 119 | 42 | 119 | 119 | 130 | 130 | 118 | 114 |
| | | DPG | 34 | 34 | 164 | 34 | 34 | 39 | 39 | 39 | 39 |
| Non-fluorinated surfactants | | E120 | — | — | — | — | — | 15 | 15 | — | — |
| | | E430 | 19 | 19 | 35 | 19 | 19 | — | — | 19 | 19 |
| | | P104 | — | — | — | — | — | 10 | 10 | — | — |
| | | P204 | 10 | 10 | 7 | 10 | 10 | — | — | 10 | 10 |
| | | LC18-63 | 4.9 | 4.9 | 7 | 4.9 | 4.9 | — | — | — | — |
| Polymerization initiator | | VA-061A | 19.6 | 19.6 | 7 | 60 | 90 | 19.6 | 19.6 | 19.6 | 19.6 |
| Emulsified liquid | Concentration of monomer components [mass %] | | 47.2 | 48.6 | 34.4 | 44.1 | 41.3 | 48 | 48 | 48.7 | 49.7 |
| Emulsion | Solid content concentration [%] | (Theoretical value) | 49 | 49.8 | 35.8 | 47.2 | 45.3 | 49.4 | 49.4 | 50.4 | 51.4 |
| | | (Measured value) | 47.6 | 35.2 | 35 | 45.5 | 43.6 | 48.5 | 48.5 | 42.3 | 49.8 |
| Fluorinated polymer | Conversion | % | ○ | X | ○ | ○ | ○ | ○ | ○ | Δ | ○ |
| | Proportions of respective units [mol %] | Units (a) | 15 | 60.7 | 0 | 33 | 20.8 | 40 | 40 | 39.8 | 39.6 |
| | | Units (b) | 85 | 39.3 | 100 | 67 | 79.2 | 60 | 60 | 60.2 | 60.4 |
| | Molecular weights | Mn | 26000 | — | 28000 | 6000 | 2500 | 14000 | 13000 | 28000 | 33000 |
| | | Mw | 51000 | — | 45000 | 8000 | 5000 | 25000 | 28000 | 44000 | 54000 |
| | Proportion of polymer having a molecular weight of at most 3000 | | ○ | — | ○ | ○ | X | ○ | ○ | ○ | ○ |

TABLE 4-continued

| Charged amount [g] | | | Ex. 23 | Ex. 24 | Ex. 25 | Ex. 26 | Ex. 27 | Ex. 28 | Ex. 29 | Ex. 30 | Ex. 31 |
|---|---|---|---|---|---|---|---|---|---|---|---|
| Article | Contact angle [°] | Water | 65 | — | 119 | 58 | 40 | 102 | 106 | 120 | 110 |
| | | n-hexadecane | 35 | — | 73 | 38 | 25 | 63 | 63 | 72 | 64 |
| | Performance after heat alkali treatment | Water contact angle [°] | <60 | — | ≥60 | <60 | <60 | ≥60 | ≥60 | ≥60 | ≥60 |
| | | Decrease in contact angle [%] | — | — | ≥30 | — | — | <30 | <30 | <30 | <30 |
| | | Judgement | X | — | Δ | X | X | ○ | ○ | ○ | ○ |

TABLE 5

| | | | Ex. 26 | Ex. 28 | Ex. 29 |
|---|---|---|---|---|---|
| PET taffeta | Water repellency | Initial | 3 | 4 | 4 |
| | | After washing 20 times | 1 | 3 | 4 |
| | Oil repellency | Initial | 0 | 1 | 2 |
| Ny-high density taffeta | Water repellency | Initial | 3 | 4 | 4 |
| | | After washing 20 times | 1 | 2 | 3 |
| | Oil repellency | Initial | 1 | 2 | 2 |

The articles in Ex. 1 to 22 treated with the present dispersion containing the copolymer A, are excellent in water-and-oil repellency, and the water-and-oil repellency is less likely to be lowered by alkali.

In Ex. 23, units (a) in the fluorinated copolymer are less than 20 mol %, whereby the article is insufficient in water-and-oil repellency.

In Ex. 24, units (a) in the fluorinated copolymer exceed 60 mol %, whereby the conversion of the monomers to the fluorinated copolymer is low.

The article in Ex. 25 is treated with a dispersion containing a fluorinated copolymer having units based on a conventional (meth)acrylate, whereby the water-and-oil repellency is lowered by hot alkali treatment.

In Ex. 26 and Ex. 27, the polymerization initiator is so much that the molecular weight of the fluorinated copolymer is low, and the water-and-oil repellency is inferior.

The article treated with the aqueous dispersion in Ex. 26 is inferior in water-and-oil repellency.

INDUSTRIAL APPLICABILITY

The fluorinated copolymer dispersion of the present invention is useful as a water-and-oil repellent composition, a release agent or a peeling agent.

This application is a continuation of PCT Application No. PCT/JP2018/041730, filed on Nov. 9, 2018, which is based upon and claims the benefit of priority from Japanese Patent Application No. 2018-004492 filed on Jan. 15, 2018. The contents of those applications are incorporated herein by reference in their entireties.

What is claimed is:

1. A fluorinated copolymer dispersion, comprising:
an aqueous medium; and
a fluorinated copolymer dispersed in the aqueous medium,
wherein
the fluorinated copolymer has units based on the following monomer (a) and units based on the following monomer (b):
monomer (a): a compound represented by the following formula (1):

$$CH_2=CH-R^f \qquad (1),$$

wherein $R^f$ is a $C_{1-8}$ perfluoroalkyl group,
monomer (b): a monomer copolymerizable with the monomer (a),
a proportion of the units based on the monomer (a) is from 20 to 60 mol % to all units constituting the fluorinated copolymer,
a number average molecular weight of the fluorinated copolymer is from 10,000 to 100,000, and
a proportion of molecules in the fluorinated copolymer having a molecular weight of 3,000 or less is at most 2% to the entire fluorinated copolymer.

2. The dispersion according to claim 1, wherein $R^f$ is a $C_{1-6}$ perfluoroalkyl group.

3. The dispersion according to claim 1, wherein the monomer (b) is a compound represented by $CH_2=CH-Q$ or $CH_2=CHCH_2-Q$, wherein Q is a halogen atom or an organic group in which a terminal atom binding to C is an oxygen atom, a nitrogen atom or a sulfur atom.

4. The dispersion according to claim 3, wherein the monomer (b) is a compound represented by $CH_2=CH-Q$, and the compound represented by $CH_2=CH-Q$ is a carboxylic acid vinyl ester, an alkyl vinyl ether, a hydroxyalkyl vinyl ether or a vinyl halide.

5. The dispersion according to claim 3, wherein the proportion of the total of the units based on the monomer (a), units based on the $CH_2=CH-Q$ and units based on the $CH_2=CHCH_2-Q$ is from 80 to 100 mol % to all units constituting the fluorinated copolymer.

6. The dispersion according to claim 1, wherein the units based on the monomer (b) comprise units based on a vinyl halide such that the proportion of the units based on the vinyl halide is from 1 to 50 mol % based on the total units based on the monomer (b).

7. The dispersion according to claim 1, wherein the proportion of molecules in the fluorinated copolymer having a molecular weight of 3,000 or less is at most 1% to the entire fluorinated copolymer.

8. The dispersion according to claim 1, further comprising:
a non-fluorinated surfactant.

9. A method for producing the fluorinated copolymer dispersion according to claim 1, the method comprising:
polymerizing, in an emulsion comprising the aqueous medium, monomer components comprising the monomer (a) and the monomer (b), a non-fluorinated surfactant and a polymerization initiator, the monomer components, thereby obtaining the fluorinated copolymer dispersed in the aqueous medium.

10. The method according to claim 9, wherein $R^f$ is a $C_{1-6}$ perfluoroalkyl group.

11. The method according to claim 9, wherein the concentration of the monomer components in the emulsion is from 40 to 70 mass %.

12. The method according to claim 9, wherein at least 80% of the monomer components is converted to the fluorinated copolymer.

13. The method according to claim 9, wherein in the obtained fluorinated copolymer, the proportion of molecules having a molecular weight of 3,000 or less is at most 1% to the entire fluorinated copolymer.

14. An article treated with the fluorinated copolymer dispersion according to claim 1.

\* \* \* \* \*